United States Patent
Asghar

(10) Patent No.: US 10,255,216 B1
(45) Date of Patent: Apr. 9, 2019

(54) MULTIPLEXED MEMORY IN A COMMUNICATION PROCESSING SYSTEM

(71) Applicant: Everspin Technologies, Inc., Chandler, AZ (US)

(72) Inventor: Sadfar Asghar, Austin, TX (US)

(73) Assignee: Everspin Technologies, Inc., Chandler, AZ (US)

(*) Notice: Subject to any disclaimer, the term of this patent is extended or adjusted under 35 U.S.C. 154(b) by 1024 days.

(21) Appl. No.: 14/541,880

(22) Filed: Nov. 14, 2014

Related U.S. Application Data

(60) Provisional application No. 61/906,216, filed on Nov. 19, 2013.

(51) Int. Cl.
| | |
|---|---|
| G06F 13/12 | (2006.01) |
| G06F 13/40 | (2006.01) |
| G06F 9/48 | (2006.01) |
| G06F 12/02 | (2006.01) |

(52) U.S. Cl.
CPC ........ *G06F 13/4027* (2013.01); *G06F 9/4881* (2013.01); *G06F 12/023* (2013.01); *G06F 2212/251* (2013.01)

(58) Field of Classification Search
CPC ............................. H04W 84/12; H04L 5/0007
USPC ......................................................... 710/308
See application file for complete search history.

(56) References Cited

U.S. PATENT DOCUMENTS

| | | | | |
|---|---|---|---|---|
| 3,387,264 A * | 6/1968 | Budny | .................... | G08C 15/06 370/294 |
| 6,609,174 B1 * | 8/2003 | Naji | .......................... | G11C 8/12 365/171 |
| 6,978,287 B1 * | 12/2005 | Langhammer | ........ | G06F 9/3824 708/230 |
| 7,072,779 B2 * | 7/2006 | Hancock | ............ | G01R 19/2513 702/60 |
| 7,506,278 B1 * | 3/2009 | Rjimati | .................. | G06F 17/505 716/104 |
| 8,204,536 B2 * | 6/2012 | Franklin | ............. | H04L 12/5692 455/550.1 |
| 8,745,319 B2 * | 6/2014 | Langlois | ............. | G06F 12/0246 711/103 |
| 9,230,631 B2 * | 1/2016 | Romanovskyy | ......... | G11C 7/14 |
| 9,490,006 B2 * | 11/2016 | Yang | ..................... | G11C 11/418 |
| 2005/0239500 A1 * | 10/2005 | Liu | ........................ | H04W 88/02 455/553.1 |
| 2007/0213941 A1 * | 9/2007 | Schmuel | .................... | G06F 1/32 702/32 |
| 2007/0274488 A1 * | 11/2007 | Callaghan | ............. | H04W 76/19 379/201.01 |
| 2009/0290540 A1 * | 11/2009 | Cherian | .................. | H04L 47/10 370/328 |
| 2010/0110775 A1 * | 5/2010 | Yoon | ........................ | G11C 8/08 365/158 |

(Continued)

*Primary Examiner* — Titus Wong
(74) *Attorney, Agent, or Firm* — Bookoff McAndrews, PLLC

(57) ABSTRACT

In some examples, a communications device includes a magnetic memory accessible by both a central processing unit and a digital signal processor to enable the central processing unit to assist the digital signal processor in establishing and maintaining a communication channel. The communication device is configured to re-establish communications in the event of an interruption in the communication channel or if the communication device experiences a power loss event.

20 Claims, 6 Drawing Sheets

(56) References Cited

U.S. PATENT DOCUMENTS

2012/0313688 A1* 12/2012 Shukh .................. H03K 17/693
327/407
2015/0332750 A1* 11/2015 Dong ...................... H01L 43/12
365/158

* cited by examiner

MULTIPLEXED MEMORY IN A COMMUNICATION PROCESSING SYSTEM

RELATED APPLICATION

This application claims priority to U.S. Provisional Application No. 61/906,216 to Asghar et al., entitled "Communication Processing System," filed Nov. 19, 2013, the contents of which are incorporated herein by reference in their entirety.

BACKGROUND

Many devices communicate over one or more wireless networks. When a communication channel is established between two communication devices, the communication devices perform an initialization or "hand shake" sequence, which can take considerable time. If the communication channel is lost or there is a power failure in one of the devices, the communication devices perform the initialization sequence again. Unfortunately, communication interruptions and small power glitches are not uncommon in some types of devices.

Additionally, some types of communication devices, such as smart phones, are mobile and may be moved from one communication network to another (e.g., from one country to another). Unfortunately, various countries and/or regions have different wireless communication standards and/or protocols, which, typically, result in the communication devices being operable in only one or two of the countries or regions, as each communication device is customized for the network standards and protocols associated with a specific country or region.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
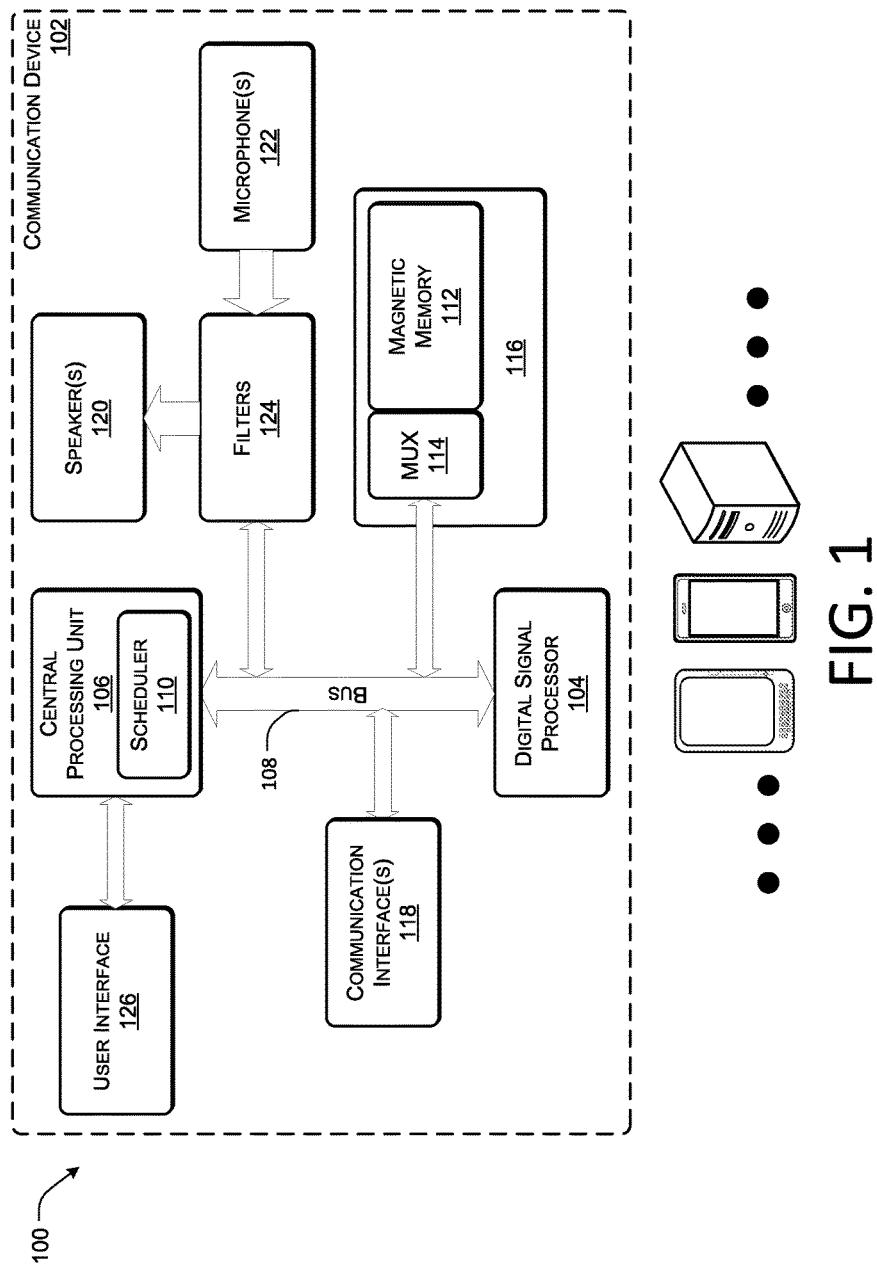
FIG. 1 illustrates an example architecture of select components of a communication device for improved reliability and flexibility according to some implementations.

This disclosure includes techniques and implementations to improve reliability and flexibility of communication devices. In general, a communication device is equipped with a magnetic memory or magnetic random access memory (MRAM) to improve reliability and flexibility. In some implementations, the magnetic memory is combined with a multiplexer (MUX) and configured to operate as a dual-port memory (or cache) accessible by both a general purpose processor, such as a central processing unit (CPU), and a digital signal processor (DSP) to allow the CPU to assist the DSP (or a compute engine) in performing the calculations to establish and maintain a communication channel.

For example, when communication devices attempt to establish a communication channel, the devices begin an initialization or hand-shake sequence. During the initialization sequence, a negotiation between the communication devices takes place in which the DSP sets various coefficients or parameters and selects one or more communication standards for use in establishing the communication channel between the devices. For example, during the initialization, the devices transmit and detect signaling call signs to determine transmission speeds, train (update coefficients) equalizers and filters, and select a modulation scheme implemented on both devices.

Unfortunately, this initialization or hand-shake sequence is often time consuming. However, by allowing both the CPU and the DSP to access the data related to the communication channel stored in the magnetic memory, some of the processing may be shifted from the DSP to the CPU to reduce the amount of time required to perform the initialization or hand-shake sequence. For instance, when the CPU is not engaged in other operations (such as responding to a user interaction with a user interface), the CPU may utilize unused cycles to perform calculations typically allocated to the DSP.

In some examples, the CPU and DSP may be configured to perform processing in parallel. In these examples, the CPU and DSP may be able to communicate data with each other using a common bus in addition to the shared data available through the magnetic memory. For instance, the CPU and DSP may each perform part of a larger calculation (e.g., applying a high pass filter) related to the communication channel and may store (or share) data using the combination MUX/magnetic memory. By utilizing the spare cycles on the CPU, the overall processing time (such as the time for completing the initialization sequence) may be reduced. In another example, the CPU may be configured to preprocess data and store the preprocessed data in the magnetic memory before the DSP performs operations utilizing the data.

In some implementations to further improve the reliability of the communication device, the magnetic memory may be configured to store the coefficients, parameters, and selected standards associated with the communication channel. Unlike traditional memories or flash based memories, magnetic memories have a high endurance (i.e., are capable of frequent updates), are non-volatile, and are able to maintain data even during periods of power loss. However, interruptions (e.g., a loss of power in one of the communication devices or loss of a wireless signal) that disrupt the communication channel are not uncommon. In these instances, typical communication devices re-establish the communication channel by re-performing the initialization sequence including the negotiation process before the data transfer can continue, as the coefficients, parameters, and standards are lost upon power failure.

In some implementations described herein, the interrupted device may be configured to re-connect to the other communication device automatically in response to an interruption in the communication channel without re-performing the hand-shake sequence by utilizing the coefficients, parameters, and standards data stored in the magnetic memory. For instance, the communication channel on the non-interrupted device remains open and since the magnetic memory incorporated into the interrupted device is able to maintain the coefficients, parameters, and standards through the power loss event or interruption, the interrupted device may reload the coefficients, parameters, and standards and re-connect to the open communication channel without a significant pause in communication and without having to re-perform the hand-shake sequence.

In one particular implementation, the magnetic memory may also be configured to store coefficients and parameters related to various wireless communication standards to allow the communication device to switch between communication networks that utilize different standards. For example, the Global System for Mobile Communications (GSM) standard is used in North America and Europe. However, the GSM networks in North America may operate at 850 or 900 mega hertz (MHz) and/or at 1,900 MHz, while European networks may operate at 900 MHz and/or at 1,800 MHz. In the present implementation, the different frequency bands used by various GSM networks may be stored in the magnetic memory, such that the DSP and/or the CPU are able to switch between standards "on the fly."

For example, if someone is traveling between the United States and Canada while talking on a cellular telephone, the cellular telephone may lose connection when switching between the 850 MHz band of the US network and the 1,900 MHz band of the Canadian network. By storing the various coefficients and parameters related to each of the standards in the magnetic memory of the cellular phone, the DSP of the cellular telephone is able to access and utilize the coefficients and parameters associated with both the 850 MHz network and the 1,900 MHz network without resetting, resulting in non-interrupted transition between the two networks. For instance, when the cellular phone switches from a US tower to a Canadian tower, the DSP may replace the coefficients and parameters related to the 850 MHz network with the coefficients and parameters associated with the 1,900 MHz network stored in the magnetic memory.

While some cellular telephones offer built-in systems for switching between the GSM networks in North America and Europe, these cellular phones do not allow for "on the fly" switching, as discussed above. Rather, these cellular phones require a system reset or a switch to be toggled within the device causing the DSP to reset and any open communication channels to be lost. These cellular telephones also fail to accommodate other network standards, such as the Interim Standard 95 (IS-95) utilized in some Asian countries, such as South Korea. However, by storing the coefficients and parameters associated with various standards, such as the IS-95 standard, in the magnetic memory, the communication devices, described herein, are able to accommodate multiple standards at multiple frequencies providing a more flexible communication device and a better user experience.

FIG. 1 illustrates an example architecture 100 of select components of a communication device 102 for improved reliability and flexibility according to some implementations. Generally, the communication device 102 may be any type of device configured to communicate over a wireless or wired communication channel. For example, the communication device 102 may be a smart phone, a cellular phone, a tablet computer, a network device (e.g., a router), a personal computer, or another type of computing device equipped with a communication interface.

The communication device 102 includes a digital signal processor (DSP) 104 in communication with a central processing unit (CPU) 106 over a communication bus 108. The DSP 104 is a special purpose processor configured to measure, filter, compress and/or otherwise modulate audio signals. For example, the DSP 104 may include features such as modulo addressing, hardware loops, 24-bit by 24-bit hardware multipliers, etc. in order to facilitate a large number of high precision arithmetic operations employed in digital signal processing. The DSP 104 may also be configured to establish and maintain communication channels with other communication devices.

The CPU 106 is a general purpose processor, access component, or at least one or more control logic circuits configured to perform the general processing of the communication device 102 (e.g., decoding user inputs received at a user interface). In some instances, the CPU 106 and/or the DPS 104 may comprise one or more processors or processing cores.

The bus 108 is configured to allow communication between the DSP 104 and the CPU 106. The bus 108 may be a data bus for passing data between the DSP 104 and the CPU 106 and/or an address bus for passing address information related to shared memories accessible by both the DSP 104 and the CPU 106. In some implementations, the bus 108 may allow a scheduler 110 residing in the CPU 106 to perform task management and joint scheduling to enable time division multiplexing by the CPU 106 and the DSP 104.

The DSP 104 and the CPU 106 are further configured to access a shared magnetic memory 112. The magnetic memory 112 may be an example of tangible non-transitory computer storage media for storage of information such as computer-readable instructions or modules, data structures, program modules or other data. Such computer-readable media may include, but is not limited to, RAM, ROM, EEPROM, or other computer-readable media technology. For example, the magnetic memory 112 is a magnetic disk storage that can be used to store information and which can be accessed by either of the processors 104 and 106. Generally, the magnetic memories are non-volatile memories with high endurance and capable of maintaining data during periods of power loss.

The magnetic memory 112 is configured to store coefficients and parameters associated with a plurality of network standards, coefficients and parameters related to open communication channels, and/or small segments of executable code. For example, the magnetic memory 112 may store various coefficients and parameters that may be utilized with encode and decode operations, such as high pass filters, orthogonalise code vectors, gain error minimizations, combined excitation calculations, interpolating frame energy, among others. In some particular implementations, the magnetic memory 112 may also act as an instructions RAM or an instructions cache to store small segments of code excitable by the CPU and/or the DSP.

In some examples, the magnetic memory 112 is combined or integrated with a multiplexer (MUX) 114. The MUX 114 is connected to the bus 108 and configured to allow for dual-port or multi-port access to the magnetic memory 112, such that both the DSP 104 and the CPU 106 are able to read and write data to and from the magnetic memory 112. In the illustrated example, the magnetic memory 112 and MUX 114 are shown as a combination MUX/magnetic memory 116. The MUX/magnetic memory 116 allows both the DSP 104 and the CPU 106 to access the memory 112 in parallel.

In some examples, the MUX 114 may be external to the magnetic memory 112. In other particular examples, the MUX 114 may be embedded with the magnetic memory 112. For instance, the MUX 114 may be affixed or adjoined to the magnetic memory 112 and/or part of a single die or package.

By utilizing the MUX 114 in combination with magnetic memory 112, the CPU 106 may assist the DSP 104 in establishing and maintaining a communication channel, as well as, in decoding, encoding and/or filtering signals received or sent over the communication channel. For instance, the DSP 104 and the CPU 106 may enable time division multiplexing or parallel processing between the processors 104 and 106 within the communication device 102. For example, in one implementation, multiply operations and multiply-accumulate operations may be reserved for execution by the DSP 104, while other operations, such as adds, subtracts, and/or compares may be reserved for execution by the CPU 106.

In one particular example, the CPU 106 and the DSP 104 may communicate parameters with each other using the combined MUX/magnetic memory 116 to share data associated with jointly implementing highly intensive algorithms, such as vector sum excited linear predictive vocoder (VSELP) algorithms. For instance, to implement VSELP, $6.45 \times 10^6$ arithmetic operations and 15.6 million instructions are executed per second. By offloading some of the operations and instructions to the CPU 106, the DSP 104 may operate at a lower clock rate, reducing the power consumption of the communication device 102.

The MUX 114 is also configured to receive a clock signal from a base station, master device, or cellular tower to enable the magnetic memory 112 to synchronize with the scheduler 110 incorporated into the CPU 106 at the various speeds or access windows necessary to adjust the communication device 102 for operating on different networks. For example, if a clock signal is able to control the MUX 114 independently, access windows for the CPU 106 and/or the DSP 104 may be adjusted dynamically to increase configurability of the communication device 102. Therefore, unlike devices utilizing dynamic random access memories (DRAM), the clock and the scheduler 110 are no longer tied directly to the speed of the CPU 106.

The communication device 102 also includes one or more communication interfaces 118 to facilitate communication between one or more networks and/or other devices. The communication interfaces 118 may also facilitate communication between one or more wireless access points, a master device, and/or one or more other computing devices as part of an ad-hoc or home network system. The communication interfaces 118 may support both wired and wireless connection to various networks, such as cellular networks, radio, WiFi networks, short-range or near-field networks (e.g., Bluetooth®), infrared signals, local area networks, wide area networks, the Internet, and so forth. In some cases, the communication interface 118 may be an analog receiver, an analog transceiver, an analog to digital conversion, and/or a digital to analog conversion. In other cases, the communication interface 118 may be a digital transceiver or other device for communicating in a digital channel.

The communication device 102 further includes one or more speakers 120 and one or more microphones 122. The speakers 120 are configured to reproduce audio signals as audible sound and the microphones 122 are configured to capture sound from an environment nearby the communication device 102 and to convert the sound into one or more audio signals that may be processed by the DSP 104. The microphones 122 may be a microphone array, a calibrated group of microphones, or multiple microphone arrays or calibrated groups. In some instances, the speakers 120 and microphones 122 may be connected to one or more filters 124. The one or more filters 124 may be one or more digital-to-analog converters for processing an audio signal before reproduction by the speakers 120 or one or more analog-to-digital converters for converting sound captured by the microphones 122 into a digital format for processing by the DSP 104.

The CPU 106 may also be connected with other device circuitry, such as a user interface 126. The user interface 126 may include other components of the communication device 102, for example, one or more input interfaces (e.g., a mouse, keyboard, touch screen display, etc.) or one or more output interfaces (e.g., a display). In general, the CPU 106 is configured to perform operations related to the user interface 126 when not engaged with operations associated with the communication channel.

Figure 2:
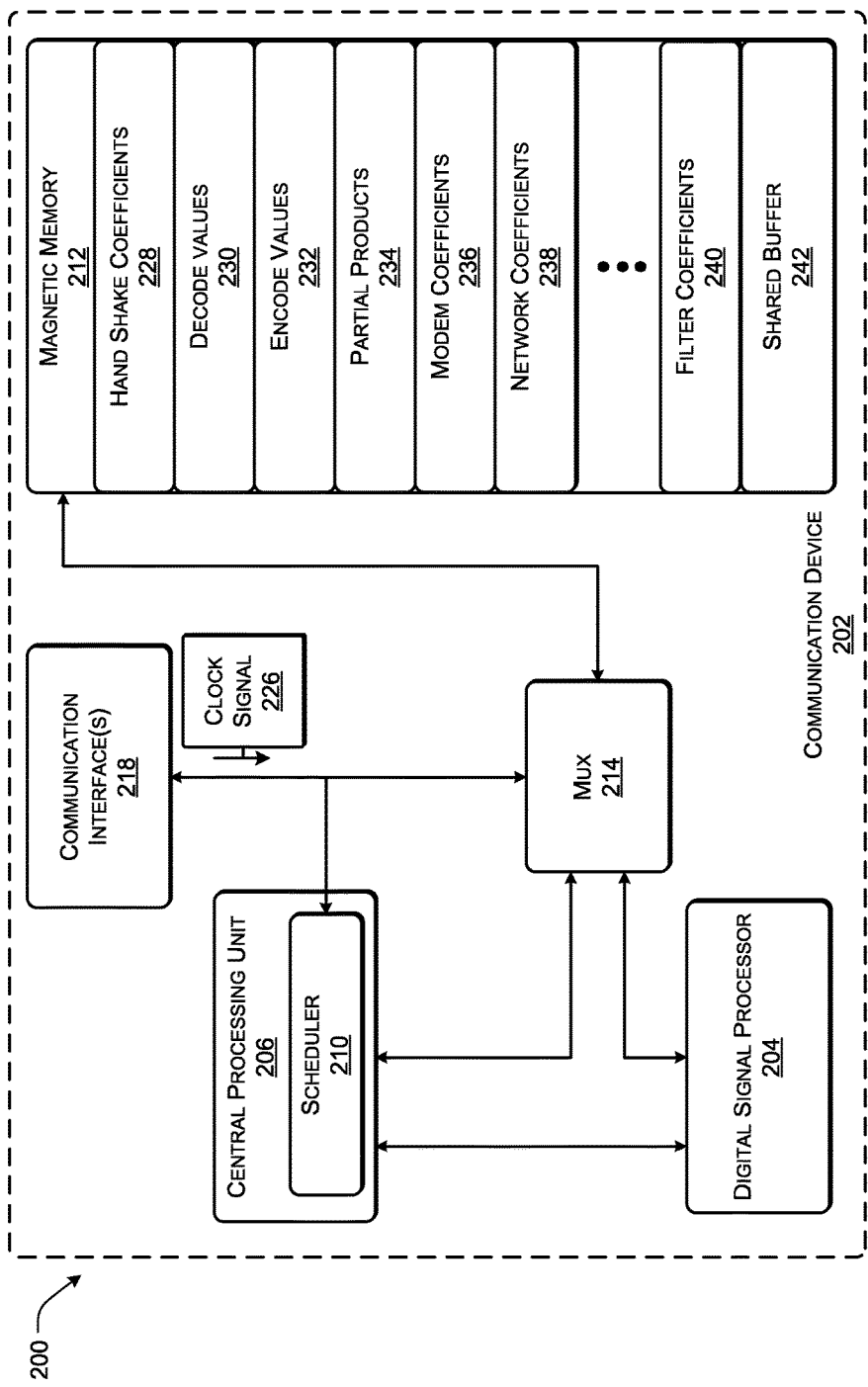
FIG. 2 illustrates another example architecture of select components of a communication device for improved reliability and flexibility according to some implementations.

FIG. 2 illustrates another example architecture 200 of select components of a communication device 202 for improved reliability and flexibility according to some implementations. As discussed above with respect to the communication device 102 of FIG. 1, the communication device 202 may be any type of device configured to communicate over a wireless or wired communication channel. For example, the communication device 202 may be a smart phone, cellular phone, tablet computer, network device (e.g., a router), a personal computer, or other computing devices equipped with a communication interface.

The communication device 202 includes a digital signal processor 204 in communication with a central processing unit 206. A scheduler 210 is incorporated into the CPU 206 to control scheduling with respect to shared processing preformed by the DSP 204 and the CPU 206 and to avoid collisions between the DSP 204 and the CPU 206 when accessing the shared magnetic memory 212. In some implementations, the scheduler 210 is a static scheduler. A static scheduler is utilized to prevent frame boundaries from being changed dynamically to further prevent collisions between the DSP 204 and the CPU 206 when accessing the magnetic memory 212.

In some cases, the magnetic memory 212 may be a single-port memory. Therefore, to allow both the DSP 204 and the CPU 206 to access the magnetic memory 212, the magnetic memory 212 is combined, connected, or integrated with MUX 214. The MUX 214 is further connected to the DSP 104 and the CPU 106 and/or to a bus for communication of data, schedule information, and/or address information between the DSP 104 and the CPU 106.

The magnetic memory 212 stores various coefficients and parameters associated with various network standards used throughout the world. For example, in the illustrated example, the magnetic memory 212 stores hand-shake coefficients 228, decode values 230, encode values 232, partial products 234, modem coefficients 236, network coefficients 238, filter coefficients 240, among other coefficients and parameters. For example, the magnetic memory 212 may store hand-shake coefficients 228 related to GSM networks operating at various frequencies as discussed above, as well as for other types of networks, such as code division multiple access (CDMA) networks.

In some implementations, the magnetic memory 212 may also include a shared buffer 242. The shared buffer 242 is a portion of the magnetic memory 212 that may be accessed by either the DSP 204 or the CPU 206 and utilized by either the DSP 204 or the CPU 206 to exchange data. For example, the CPU 206 may store the results of a partial calculation that the DSP 204 may access and utilize to complete the calculation and obtain one of the coefficients 228-240. In this way, the DSP 204 and the CPU 206 may utilize the shared buffer 242 for temporary and/or generic storage.

In one example, assume that the communication device 202 establishes a communication channel with a second device. During the initialization sequence, a negotiation between the communication devices takes place in which the DSP 204, and in some cases the CPU 206, sets various coefficients (or parameters) and selects one or more communication standards for use in establishing the communication channel. Once selected, the coefficients and/or parameters are stored in the magnetic memory 212, in addition to the coefficients and parameters associated with the different network standards.

As discussed above, the magnetic memory 212 has high endurance (is capable of frequent updates), is non-volatile, and is able to maintain data even during periods of power loss. Therefore, during the initialization sequence, the coefficients, parameters, and standards selected are stored in the magnetic memory 212. Thus, if an interruption or power failure event occurs, the coefficients, parameters, and standards are maintained. In this manner, following an interruption or power failure event, the communication device 202 is able to load the coefficients and parameters from the magnetic memory 212 and to re-connect to the other device automatically without re-performing the initialization.

Additionally, in some implementations, during operation both the communication device 202 and the other device continually update the coefficients and parameters selected and/or set during initialization in order to improve signal quality. These updated coefficients and parameters are also stored in the magnetic memory 212, such that if the call is lost the communication device 202 is not only able to re-connect to the other device without re-performing the initiation sequence but also with the most update or optimized coefficients and parameters. In this manner, the signal quality of the re-connected call or communication is on substantially similar to the signal quality achieved in the original call or communication at the time of disconnect and the communication device 202 may begin updating or optimizing the coefficients and parameters from the values at time of disconnect instead of from the values set during initiation.

In some cases, many of the operations performed with respect to encoding and decoding the signal received over the communication interfaces 218 may be preprocessed and the results stored in the magnetic memory 212. In some implementations, the operations that may be preprocessed may be assigned by the scheduler 210 to be executed by the CPU 106 and the results stored in the magnetic memory 212 for use in more complicated or time sensitive operations performed by the DSP 204. In this manner, the CPU 206 is able to assist the DSP 204 in establishing the communication channel, as well as, decoding and encoding communication signals received and sent over the communication channel. In some cases, the communication interface 218 may be an analog receiver, an analog transceiver, an analog to digital conversion, and/or a digital to analog conversion. In other cases, the communication interface 118 may be a digital transceiver or other device for communicating in a digital channel.

The MUX 214 and the scheduler 210 are also configured to receive a clock signal 226 over the communication interface 218 from a base station, central office, or cell tower. To illustrate, when the scheduler 210 receives the clock signal 226 from the base station, the communication device 202 establishes a communication channel and the scheduler 210 begins to schedule tasks for the DSP 104 and the CPU 106 based on the clock signal 226. For example, in response to receiving the clock signal 226, the scheduler 210 may schedule tasks for the DSP 104 and the CPU 106 on a 20 millisecond (ms) frame with a 5 ms sub-frame to code and decode pitch and vocal track information related to a voice call. By also allowing the MUX 214 to receive the clock signal 226 directly, the MUX 214 is able to open and close the apertures used by the DSP 204 and the CPU 206 to read and/or write data to and from the magnetic memory 212. Since different network standards utilize different bandwidths, the MUX 214 may set the read and/or write access windows based on a speed associated with the bandwidth required instead of at the clock speed associated with the CPU 206.

In some implementations, the scheduler 210 is able to schedule tasks for both the DSP 204 and the CPU 206, such that the CPU 206 is able to preprocess data for use by the DSP 204 and/or to allow the DSP 204 and CPU 206 to perform parallel processing while preventing collisions when accessing the shared magnetic memory 212. For example, many communication standards utilize code books of common coefficients and parameters, which may be calculated prior to receiving a communication signal over the communication interface 218 by the CPU 206.

Figure 3:
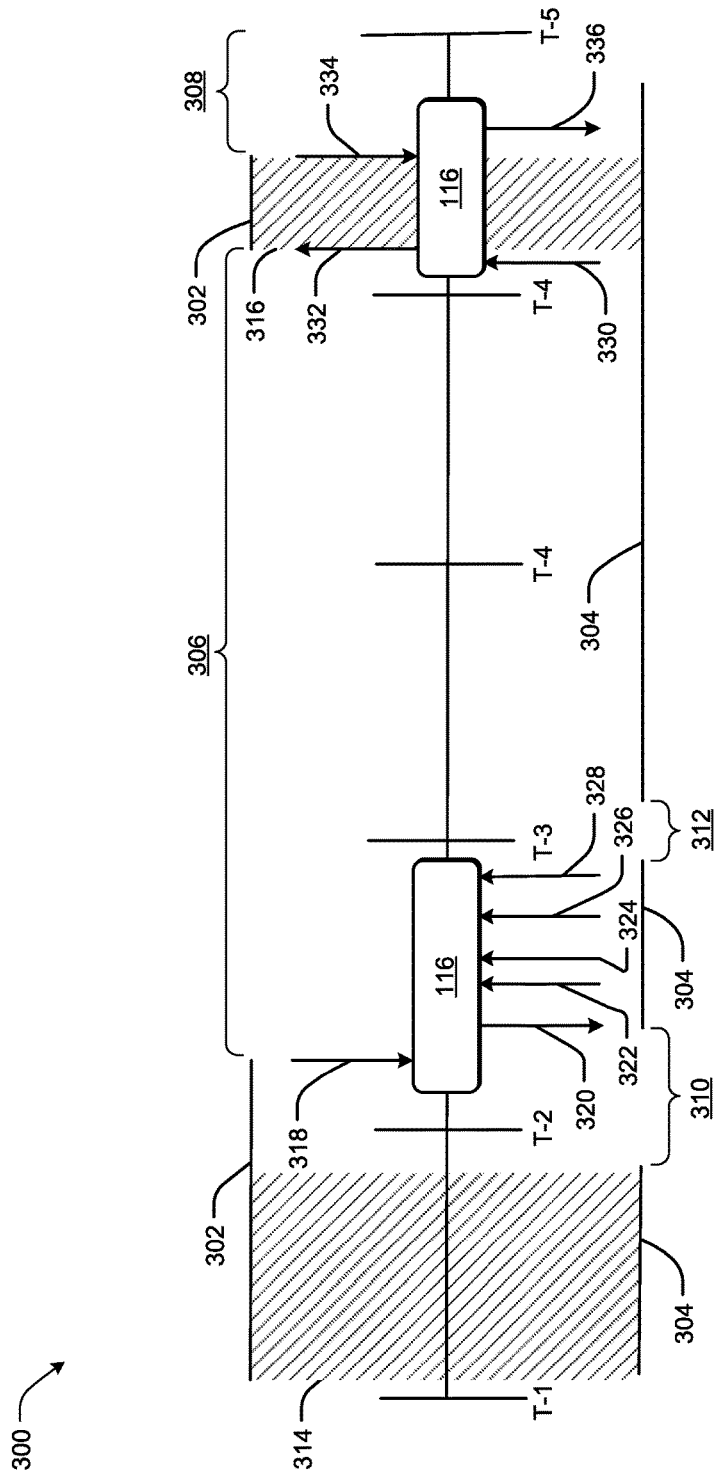
FIG. 3 illustrates a timing diagram to show an example of the partitioning of operations between a digital signal processor and a central processing unit according to some implementations.

FIGS. 1 and 2 provide example architectures of a communication device including a magnetic memory shared between a DSP and a CPU for providing assisted processing to the DSP. FIG. 3 provides an example timing diagram illustrating an example schedule in which the CPU is able to assist the DSP in performing calculations associated with encoding and decoding communication signals received and sent via the communication interfaces.

FIG. 3 illustrates a timing diagram 300 to show an example of the partition of operations between a digital signal processor (e.g., the DSP 104 of FIG. 1 and the DSP 204 of FIG. 2) and a central processing unit (e.g., the CPU 106 of FIG. 1 and the CPU 206 of FIG. 2), according to some implementations. The timing diagram 300 shows a schedule of operations performed by the DSP and the CPU over a 5 ms sub-frame of a 20 ms frame, from time T-1 to time T-5. In the illustrated example, line 302 shows when the CPU is performing calculations or operations and line 304 shows when the DSP is performing calculations or operations. As illustrated, lines 302 and 304 include gaps, generally indicated by 306, 308, 310, and 312. The gaps 306 and 308 indicate periods of time when the CPU is not engaged in operations related to encoding or decoding of communication signals, and gaps 310 and 312 indicated periods of time when the DSP is not engaged in operations related to encoding or decoding of communication signals.

The illustrated timing diagram 300 also shows shaded areas 314 and 316 indicating periods of time when the CPU and DSP are engaged in parallel or simultaneous processing. As discussed above, both the CPU and DSP are configured to access and share data via MUX/magnetic memory 116 of FIG. 1. Arrows 318-336 illustrate data being transferred between the CPU and/or the DSP and the MUX/magnetic memory 116, such that the DSP and CPU are able to share data for coordinated, simultaneous, or parallel processing.

In general, at a time T-1, the DSP and the CPU are engaged in parallel processing or simultaneous processing. For example, the CPU may be performing a decoding operation (such as generating combined excitations), while the DSP is performing an encoding operation (such as a high pass filter and/or autocorrelation and windowing operation). Before time T-2, the DSP completes the encode operation and experiences a pause in usage as indicated by gap 310, while the CPU continues to perform decode operations. At arrow 318, the CPU has completed the decode operations and stores the results in the MUX/magnetic memory 116. The DSP is then able to retrieve the stored results from the MUX/magnetic memory 116 and continue to execute the decoding of the communication signal started by the CPU. For example, the CPU may have performed several convert operations and stored the results in the MUX/magnetic memory 116. The DSP may then retrieve the results, as illustrated by arrow 320, and continue to decode the signal, for example, by performing an address pointer update based on the results of the conversions.

Between times T-2 and T-3, the DSP performs additional encode and/or decode operations and stores additional data in the MUX/magnetic memory 116, as indicated by arrows 322, 324, 326, and 328. While the DSP is performing operations and storing data on the MUX/magnetic memory 116, the CPU is not in use, as indicated by the gap 306, and may be put to sleep to conserve power or may be directed to perform operations associated with other circuitry of the communication devices. For example, the CPU may be performing operations related to interpreting a user input at a user interface.

At time T-3, the DSP experiences another pause in processing, such that both the DSP and the CPU may be put to sleep to conserve power on the communication device. Between times T-3 and T-4, the DSP is awakened by, for example, the scheduler to perform additional operations (such as predicting long term lag experienced by the communication channel).

In the illustrated example, the DSP continues to perform operations, while the CPU is asleep or occupied elsewhere until after time T-4 when the CPU is awakened by the scheduler. At this time, the CPU retrieves data from the MUX/magnetic memory 116, performs one or more operations, and stores the resulting data back in the MUX/magnetic memory 116. For example, the scheduler may have the DSP perform some of the operations related to predicting long term lag experienced by the communication channel but may allow the final operations to be performed by the CPU. In this example, the DSP stores the results of the operations related to predicting long term lag the in the MUX/magnetic memory 116, as indicated by arrow 330, and the CPU retrieves the results, as indicated by arrow 332, and completes the calculations. After storing the results, the DSP is freed up to perform other operations. In this manner, the communication of data between the CPU and the DSP via the MUX/magnetic memory 116 allows the CPU to assist the DSP in encoding and decoding communication signals, thereby reducing the overall processing time.

Figure 4:
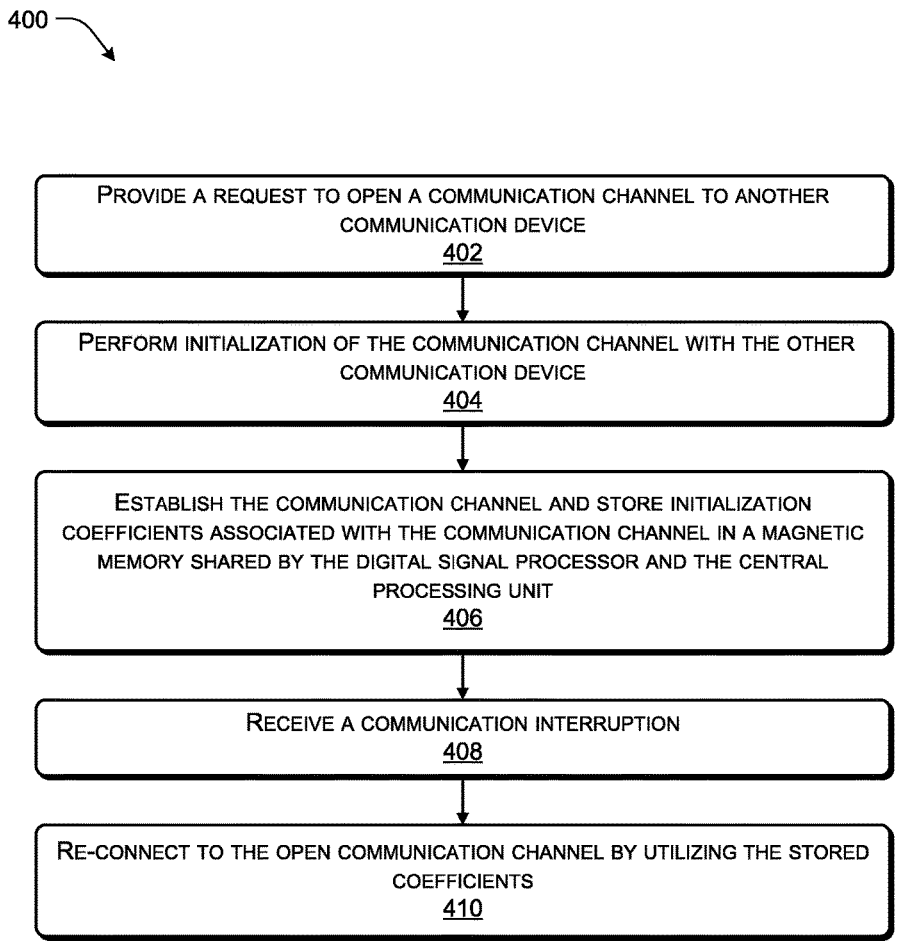
FIG. 4 illustrates an example flow diagram showing an illustrative process for re-connecting to an open communication channel according to some implementations.
Figure 5:
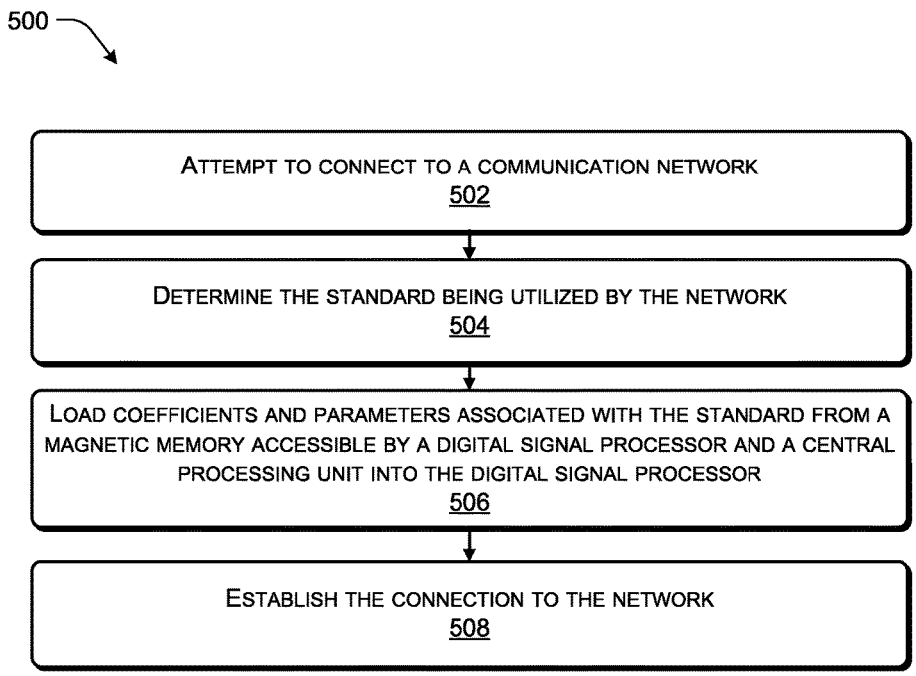
FIG. 5 illustrates an example flow diagram showing an illustrative process for connecting to a communication network according to some implementations.

FIGS. 4 and 5 are flow diagrams illustrating example processes for utilizing a magnetic memory accessible by both a CPU and a DSP according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 4 illustrates an example flow diagram showing an illustrative process 400 for utilizing the communication device of FIGS. 1 and 2 to re-connect to an open communication channel according to some implementations. At 402, a first communication device provides a request to open a communication channel to a second communication device. For example, the first communication device may be a server system and the second communication device may be a client, and the server may be attempting to update the client with, for instance, new drivers.

At 404, the first communication device performs an initialization sequence (e.g., hand-shake procedures) with the second communication device. During the initialization sequence, a negotiation between the communication devices takes place in which the DSP sets various coefficients (or parameters) and selects one or more communication standards for use in establishing the communication channel. For example, the first communication device (e.g., the server) may have several different connection speeds (e.g., high, intermediate, and slow), while the second communication device (e.g., the client) may be an old machine operating at the slowest connection speed. By performing the initialization sequence, the server is able to determine that the client is operating at the slowest speed. For instance, the server may attempt to connect to the client first using the high speed connection, then the intermediate speed and finally the slow speed. Since the client is unable to operate at the high speed or the intermediate speed, the client only responds to the slow speed message. When the server receives the response, the server is able to note the connection speed as one of the coefficients associated with establishing the communication channel (e.g., the coefficients 228-240 of FIG. 2).

At 406, the first communication device establishes the communication channel and stores the initialization coefficients associated with the second communication device (such as the speed of the client in the example above) in a magnetic memory shared by a DSP and a CPU of the communication device. The magnetic memories have a high endurance (are capable of frequent updates), are non-volatile, and are able to maintain data even during interruptions (e.g., periods of power loss).

At 408, the first communication device receives a communication interruption. For example, the first communication device may have experienced a power fluctuation causing the first communication device to lose power for a short period of time. Since the coefficients and parameters associated with the communication channel are stored in a magnetic memory, the coefficients and parameters are maintained through the power loss event.

At 410, the first communication device re-connects to the open communication channel by utilizing the stored coefficients and parameters. For instance, the communication channel on the second communication device remains open and since the magnetic memory incorporated into the first communication device is able to maintain the coefficients and parameters through the power loss event, the first communication device is able to reload the coefficients and parameters and to re-connect to the open communication channel of the second communication device without having to re-perform the hand-shake sequence.

FIG. 5 illustrates an example flow diagram showing an illustrative process 500 for utilizing the communication device of FIGS. 1 and 2 to connect to a communication network according to some implementations. At 502, the communication device 502 attempts to connect to a communication network. For example, the communication device may be a cellular telephone and may be connecting to a wireless communication network.

At 504, the communication device determines the standard being utilized by the network. For example, as described above, North America and Europe utilize GSM based standards at different frequencies, while other countries such as Korea utilize the IS-95 based standard. Thus at 504, the communication device determines which of the various standards used by the different countries around the world are being utilized by the network.

At 506, the communication device loads coefficients and parameters associated with the standard from a magnetic memory accessible by a DSP and a CPU of the communication device into the DSP. For example, the DSP is configured to perform the various operations required to communicate over networks utilizing the GSM, CDMA, IS-95 based standards, and/or updated or future version of known standards, as well as other known standards. However, the algorithms utilized by the DSP may need to be adjusted for each of the different standards. For instance, the frequency may need to be shifted from 850 MHz to 1,900 MHz as described above. By loading the coefficients and parameters from the magnetic memory into the DSP, the DSP may be configured on the fly to connect via the various different communication standards used by networks worldwide.

At 508, the communication device establishes the connection to the network. For example, if the communication device is a cellular telephone, the communication device may connect to various data networks (e.g., 4G and/or long term evolution (LTE) networks) for receiving updates and downloads, as well as voice networks for receiving calls.

Figure 6:
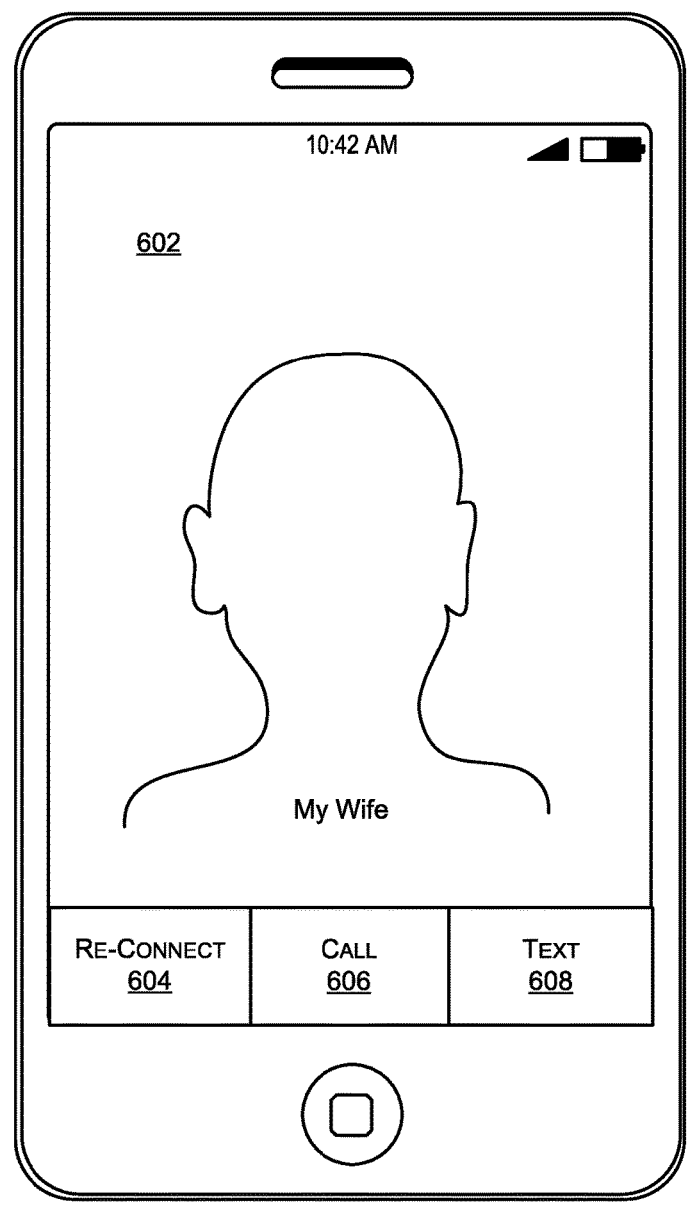
FIG. 6 illustrates an example interface for re-connecting a communication device to a communication channel according to some implementations.

FIG. 6 illustrates an example user interface of a communication device 600 for re-connecting the communication device 600 to a communication channel according to some implementations. For example, as discussed above, the user of the communication device 600 may be engaged in a conversation with his wife over a communication channel established by the communication device 600. The coefficients and parameters associated with the call may be stored in the magnetic memory accessible by both the CPU and the DSP, for example, as illustrated in FIG. 2.

In the illustrated example, assume that the communication device 600 experienced a power loss event or interruption, which caused the call to be lost. When the communication device 600 powers back up, the communication device 600 is able to determine that the communication device 600 was in the middle of a call with the user's wife when the power loss event or interruption occurred and to display a user interface 602 showing the user's wife profile and user selectable options 604, 606, and 608.

User selectable option 604 allows the user to re-connect to the open communication channel. For instance, as described above, if the user selects option 604, the communication device 600 is able to re-connect to the communication channel by loading the coefficients and parameters stored in the magnetic memory (e.g., magnetic memory 112 or 212 of FIGS. 1 and 2) during the initialization or hand-shake sequence. The user interface 602 also includes option 606 to call the user's wife and option 608 to text the user's wife. If the user selects either option 606 or 608, the communication device 600 establishes a new communication channel with the wife's communication device and may store (or replace) the coefficients and parameters associated with the new communication channel in the magnetic memory.

Although the inventions have described, to a large extent, in the context of terrestrial communications, systems and devices, the inventions may be employed or implemented in and/or enable satellite-to-satellite communications. In these embodiments, the system may eliminate and/or reduce dependency on ground station repeaters or hubs. Such embodiments enable more efficient and direct communication between satellites (for example, intra-satellite communications).

Notably, the embedded magnetic memory (for example, of FIG. 2) may further include a scratch pad memory portion (not illustrated). Such scratch pad memory portion may be employed as a cache for the central processing unit.

Further, while at times the magnetic memory is described as embedded in one or more of the central processing units, such magnetic memory may be embedded or discrete. For the sake of brevity, the discussion regarding embedded memory embodiments will not be repeated as discrete embodiments—however, such discrete embodiments are intended to fall within the scope of the present inventions.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A device comprising:
   a digital signal processor (DSP) configured to run digital signal processing algorithms associated with a plurality of network standards;
   a central processing unit (CPU), wherein the CPU includes a scheduler configured to perform task management for the DSP and the CPU, and wherein the CPU is configured to assist the DSP in running the digital signal processing algorithms;
   a bus configured to transfer data and addresses between the CPU and the DSP;
   at least one communication interface for communicating to one or more networks;
   a magnetic memory accessible by the CPU and the DSP, wherein the magnetic memory is configured to store coefficients and parameters related to the plurality of network standards, and wherein the device utilizes the coefficients and parameters to automatically connect to an open communication channel in response to a communication interruption; and
   a multiplexer coupled to the magnetic memory, wherein the multiplexer is configured to allow the CPU and the DSP to access the magnetic memory in parallel, and wherein the multiplexer is configured to control access windows for reading and writing data to the magnetic memory.

2. The device as recited in claim 1, wherein the magnetic memory and the multiplexer are combined on a single package.

3. The device as recited in claim 2, wherein the digital signal processing algorithms include at least one of:
a code excited linear predictive coding algorithm; or
a base band processing of a digital transmission system.

4. The device as recited in claim 1, wherein the scheduler causes multiple, divide, and accumulate operations to be processed by the DSP, and causes other operations to be processed by the CPU.

5. The device as recited in claim 1, wherein the scheduler allows the CPU and the DSP to perform parallel processing.

6. An apparatus comprising:
a digital signal processor (DSP);
a central processing unit (CPU);
a bus coupled to the CPU and the DSP;
at least one communication interface for communicating to one or more networks;
a magnetic memory accessible by the CPU and the DSP, wherein the magnetic memory is configured to store coefficients data related to a plurality of network standards, and wherein the apparatus utilizes the coefficients data to automatically connect to an open communication channel in response to a communication interruption; and
a multiplexer coupled to the magnetic memory, wherein the multiplexer is configured to allow the CPU and the DSP to access the magnetic memory by time-division multiplexing.

7. The apparatus as recited in claim 6, wherein the DSP reads the coefficients data related to a selected one of the plurality of network standards in response to the communication interface detecting a network utilizing the selected one of the plurality of network standards.

8. The apparatus as recited in claim 6, wherein:
the DSP and the CPU store parameters related to a communication channel established with a remote device over the communication interface in the magnetic memory while the communication channel is open; and
the DSP and the CPU load the stored parameters from the magnetic memory to re-connect to the communication channel with the remote device in response to an interruption in the communication channel.

9. The apparatus as recited in claim 6, wherein the multiplexer is configured to receive a master clock signal for scheduling memory accesses for the CPU and the DSP on the magnetic memory.

10. The apparatus as recited in claim 9, wherein the master clock signal is received over the communication interface from a base station.

11. The apparatus as recited in claim 6, wherein the CPU and the DSP share data using the magnetic memory.

12. The apparatus as recited in claim 6, wherein the DSP operates at a clock speed of the CPU.

13. The apparatus as recited in claim 6, wherein the CPU includes a scheduler for avoiding collisions between the CPU and the DSP when accessing the magnetic memory.

14. A computing device comprising:
a digital signal processor (DSP);
a general purpose processor;
a magnetic memory configured to store data accessible and updatable by the general purpose processor and the DSP, wherein the computing device utilizes the stored data to automatically connect to an open communication channel in response to a communication interruption; and
a multiplexer coupled to the magnetic memory, wherein the multiplexer is configured allow the general purpose processor and the DSP to access the magnetic memory in parallel, and wherein the multiplexer is configured to control access by the general purpose processor and the DSP to the magnetic memory by time-division multiplexing.

15. The computing device as recited in claim 14, wherein the data includes at least one of:
coefficients associated with algorithms stored on the DSP;
coefficients associated with one or more network standards;
parameters associated with algorithms stored on the DSP;
parameters associated with one or more network standards; or
code executable by the DSP or general purpose processor.

16. The computing device as recited in claim 14, wherein, in response to connecting to a particular network operating under a particular standard, the data stored in the magnetic memory and associated with the particular standard is loaded into the DSP.

17. The computing device as recited in claim 14, wherein:
the DSP and the general purpose processor are configured to store coefficients and parameters related to a communication channel established with a remote device in the magnetic memory while the communication channel is open; and
the DSP and the general purpose processor load the stored coefficients and parameters from the magnetic memory to re-connect to the communication channel with the remote device in response to an interruption in the communication channel.

18. The computing device as recited in claim 14, wherein the general purpose processor is configured to perform operations to assist the DSP.

19. The computing device as recited in claim 18, further comprising a user interface, wherein the general purpose processor is further configured to perform operations associated with the user interface.

20. The computing device as recited in claim 14, further comprising:
a scheduler incorporated into the general purpose processor,
wherein the scheduler and the multiplexer are configured to receive a clock signal from a base station for scheduling accesses to the magnetic memory when the computing device is connected to a network.

* * * * *

UNITED STATES PATENT AND TRADEMARK OFFICE
CERTIFICATE OF CORRECTION

PATENT NO. : 10,255,216 B1
APPLICATION NO. : 14/541880
DATED : April 9, 2019
INVENTOR(S) : Safdar Asghar Page 1 of 1

It is certified that error appears in the above-identified patent and that said Letters Patent is hereby corrected as shown below:

On the Title Page

In the "Inventor" section, "Sadfar Asghar" should read --Safdar Asghar--

Signed and Sealed this
Sixth Day of August, 2019

Andrei Iancu
*Director of the United States Patent and Trademark Office*